W. J. HILTON.
CARVING FORK.
APPLICATION FILED MAR. 19, 1915.
1,160,895.
Patented Nov. 16, 1915.
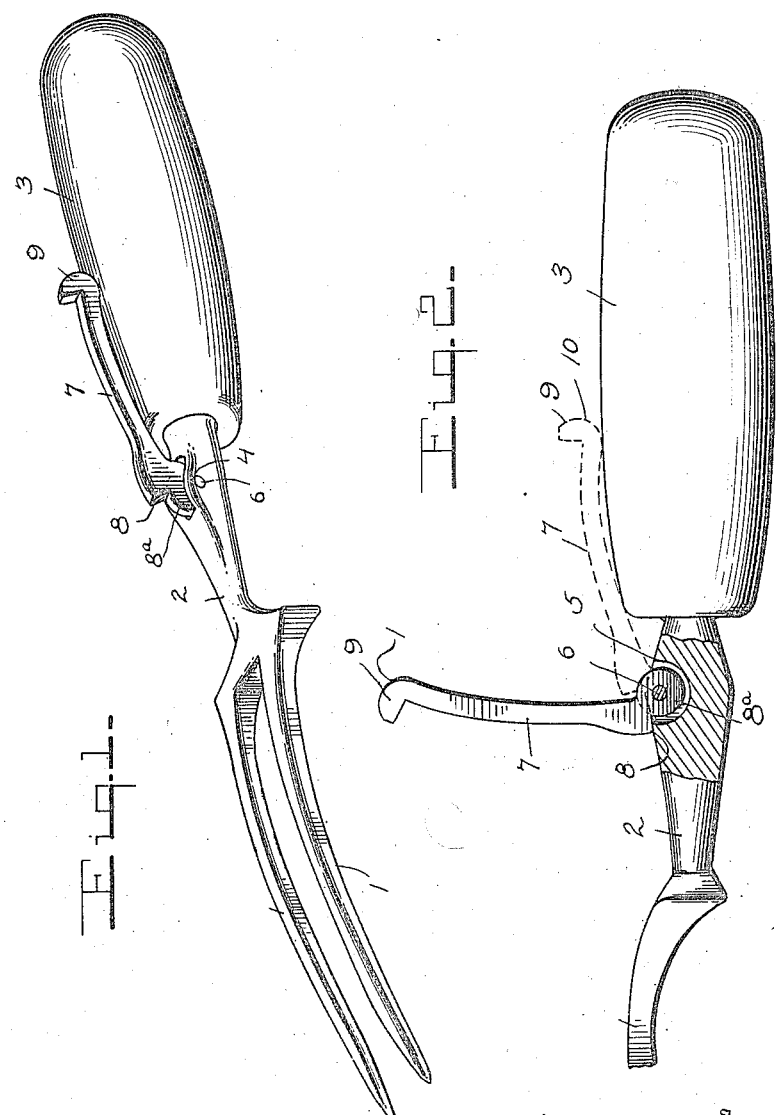
Inventor
W. J. Hilton

UNITED STATES PATENT OFFICE.

WILLIAM J. HILTON, OF SAN FRANCISCO, CALIFORNIA.

CARVING-FORK.

1,160,895.  Specification of Letters Patent.  Patented Nov. 16, 1915.

Application filed March 19, 1915. Serial No. 15,503.

*To all whom it may concern:*

Be it known that I, WILLIAM J. HILTON, a subject of the King of Great Britain, residing at San Francisco, in the county of San Francisco and State of California, have invented certain new and useful Improvements in Carving-Forks; and I do hereby declare the following to be a full, clear, and exact description of the invention, such as will enable others skilled in the art to which it appertains to make and use the same.

This invention relates to forks, more particularly designed as a carving fork, and one of the principal objects of the invention is to provide a carving fork with a guard which normally lies in contact with the handle and which can be swung up into position to guard the hand with the thumb of the fork hand. Carving forks usually are provided with a guard which normally lies with its end between the tines of the fork, and when used must be raised with the knife hand.

The object of this invention is to provide a guard which can be thrown up into position by the thumb of the fork hand.

The foregoing and other objects may be attained by means of the construction illustrated in the accompanying drawing, in which—

Figure 1 is a perspective view of a fork provided with a guard connected thereto in accordance with this invention, Fig. 2 is a side elevation and partial section of the same showing the guard thrown up in position for use in full lines and shown thrown down against the handle in dotted lines, the tines being broken away.

Referring to the drawing, the numeral 1 designates the tines of the fork, and 2 is the shank of the fork, the handle 3 being secured to the shank in the usual or any suitable manner. The shank 2 is provided with an enlargement 4 provided with a recess 5 in the upper portion thereof thus forming pintle bearings for a transverse pintle 6.

The guard 7 is provided with a knuckle 8ª pivoted in the recess 5 on the pintle 6, said guards having a shoulder 8 adapted to engage the front wall of the recess 5 at the top of the shank 2, said guard adapted to be swung downward against the handle 3 when not required for use. At the free end of the guard 7 is a head or stop 9 having a rounded outer surface 10. The stop 9 is provided with an abrupt shoulder which would stop the knife in case it slipped over the tines and guard, when the latter was lying on the handle 3.

When the fork is to be used for carving purposes it is taken in the left hand and the thumb of the left hand is pushed underneath the guard 7 by engaging the rounded portion 10 of the guard.

From the foregoing it will be obvious that a fork having a guard made in accordance with this invention and pivoted to swing forwardly, can be pushed in position by the thumb of the fork hand, thus obviating the use of two hands to raise the guard in position for use.

Various changes may be made in the details of construction without departing from the spirit and scope of the invention as defined in the claims.

What is claimed is:—

1. A carving fork comprising tines, a shank, a handle connected to the shank, and a guard pivoted in a recess in the shank and provided with a shoulder on its front end to engage the upper side of the shank when in position for use, said guard having a stop shoulder having an abrupt stop, and a rounded free end to admit the thumb of the fork hand throwing the guard up in position for use.

2. A fork having a guard normally lying in contact with the handle and adapted to be swung forwardly in position for use by the thumb of the fork hand, said guard having a shoulder or stop at its front side to engage the upper side of the shank of the fork, said guard having a stop shoulder at its free end.

In testimony whereof I affix my signature in presence of two witnesses.

WILLIAM J. HILTON.

Witnesses:
W. EVERETT BRISTOL,
M. D. BROWN.

Copies of this patent may be obtained for five cents each, by addressing the "Commissioner of Patents, Washington, D. C."